United States Patent [19]

Fukuda

[11] 4,393,110

[45] Jul. 12, 1983

[54] MAGNETIC RECORDING MEDIUM

[75] Inventor: Kazumasa Fukuda, Tokyo, Japan

[73] Assignee: TDK Electronics Co., Ltd., Tokyo, Japan

[21] Appl. No.: 341,052

[22] Filed: Jan. 20, 1982

[51] Int. Cl.³ .............................................. B32B 3/00
[52] U.S. Cl. .................................. 428/173; 428/338; 428/694; 428/900
[58] Field of Search ............... 428/900, 173, 694, 338; 427/128-132, 127, 48; 219/121 EH, 121 EJ

[56] References Cited

U.S. PATENT DOCUMENTS 4,117,301 9/1978 Goel et al. .................... 219/121 EK
4,131,782 12/1978 Einstein ....................... 219/121 EH Primary Examiner—Bernard D. Pianalto
Attorney, Agent, or Firm—Oblon, Fisher, Spivak, McClelland & Maier

[57] ABSTRACT

A magnetic recording medium comprising a non-magnetic substrate having fine holes in a direction of thickness and a magnetic material filled in said fine holes. The fine holes have a diameter ranging from 200 Å to 5000 Å and a depth ranging from 2000 Å to 5 μm at a ratio of depth to diameter of 1 or more.

2 Claims, 4 Drawing Figures

MAGNETIC RECORDING MEDIUM

BACKGROUND OF THE INVENTION

1. Field of the Invention

The present invention relates to a magnetic recording medium having a special structure and a preparation thereof.

2. Description of the Prior Art

It is the most important problem to attain high density of magnetic recording. Various approaches have been proposed for providing high density of magnetic recording in various fields. Among the proposals, a vertical recording system for magnetization in vertical direction to the surface of the magnetic recording medium has been proposed as the novel recording system for super high density recording and the super high density characteristics have been provided.

SUMMARY OF THE INVENTION

It is an object of the present invention to provide a magnetic recording medium suitable for super high density vertical magnetic recording.

It is another object of the present invention to provide a process for producing a magnetic recording medium suitable for super high density vertical magnetic recording.

The foregoing and other objects of the present invention have been attained by providing a magnetic recording medium comprising a non-magnetic substrate having fine holes in a direction of thickness and a magnetic material filled in the fine holes which have a diameter ranging from 200 Å to 5000 Å and a depth ranging from 2000 Å to 5 μm at a ratio of depth to diameter of 1 or more.

The magnetic recording medium of the present invention can be produced by forming the fine holes by emission of focused energy beams on the surface of the non-magnetic substrate and filling the fine holes with the magnetic material.

DETAILED DESCRIPTION OF THE PREFERRED EMBODIMENTS

Figure 1:
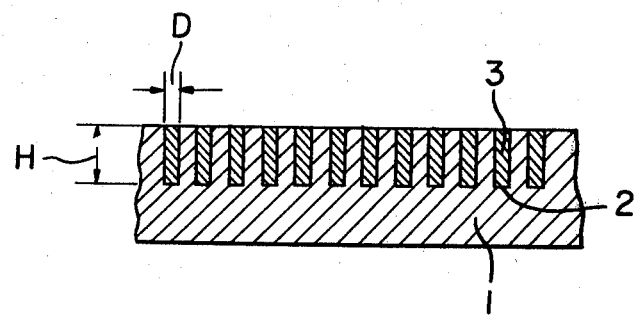
FIG. 1 is a sectional view of a part of a magnetic recording medium of the present invention.

Referring to the drawings, the magnetic recording medium of the present invention will be illustrated.

FIG. 1 is a sectional view of a part of the magnetic recording medium of the present invention, wherein the reference numeral (1) designates a non-magnetic substrate which can be a polymer such as nitrocellulose in which carbon black is dispersed or a metallic substrate such as a tellurium alloy. The reference numeral (2) designates many fine holes formed in the direction of thickness of the non-magnetic substrate (1) and the fine holes are filled with a magnetic material (3). In the formation of the fine holes (2), the method of emission of focused electron beams on the surface of the non-magnetic substrate (1) has been employed in the process of the present invention.

It has been known to produce a vertical magnetic recording medium by a conventional technology as disclosed in Japanese Unexamined Patent Publication No. 15597/1976 wherein a layer having many fine holes is formed on the surface of the substrate made of aluminum or aluminum alloy by anodic oxidation and a magnetic material is filled in the fine holes.

In the conventional technology, it has been difficult to control the size and density of the fine holes as desired and it has been difficult to maintain uniformity of the fine holes.

In accordance with the present invention, the fine holes (2) are formed by emission of focused electron beams on the surface of the non-magnetic substrate (1) whereby the size and density of the fine holes (2) can be easily controlled as desired by selecting a condition of emission of electron beams and the uniformity of the fine holes (2) can be excellent. It is possible to employ laser beams instead of electron beams.

The diameter D of the fine holes (2) is preferably in a range of 200 Å to 5000 Å and the depth H of the fine holes (2) is preferably in a range of 2000 Å to 5 μm and the ratio of depth to diameter H/D is preferably 1 or more especially about 10. The fine holes are preferably formed in perpendicular to the surface of the substrate (1) in a column form.

When the diameter D is less than 200 Å, the magnetic material (3) filled in the fine holes (2) impart super paramagnetic property to be difficult to use it as a magnetic recording medium. When the diameter D is more than 5000 Å, it is difficult to attain high resolution in a digital recording and it is not suitable for the purpose of the present invention for high dense recording. When a ratio of depth to diameter H/D is less than 1, it is difficult to attain vertical magnetization. In view of the effect of demagnetization, the ratio H/D is preferably about 10.

Figure 2:
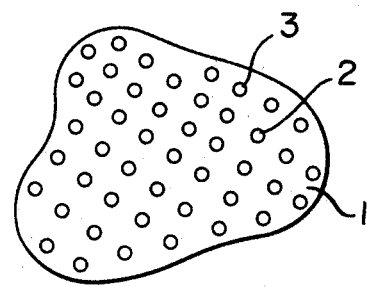
FIG. 2 is a plane view of the part of the magnetic recording medium thereof.

FIG. 2 is a plane view of a part of the vertical magnetic recording medium of the present invention and the distribution of the fine holes (2) is shown. The surface density of the fine holes on the non-magnetic substrate (1) is preferably in a range of $1.6 \times 10^7$ holes/cm$^2$ to $1.6 \times 10^{11}$ holes/cm$^2$. When the surface density is less than $1.6 \times 10^7$ holes/cm$^2$, it is not suitable for the purpose of the invention which provides high density recording. When the surface density is more than $1.6 \times 10^{11}$ holes/cm$^2$, magnetic mutual action of the magnetic material (3) in the fine holes (2) is too high to attain high dense recording.

The magnetic material (3) filled in the fine holes (2) can be iron, cobalt, nickel or alloys thereof, or magnetic oxides such as $\gamma$—$Fe_2O_3$, Co—$\gamma$—$Fe_2O_3$, $Fe_3O_4$ and $CrO_2$.

In order to fill the magnetic material in the fine holes (2), a chemical plating process, an electric plating process, an evaporation-deposition process, a sputtering process or a process for coating a magnetic paint containing the magnetic powder can be preferably employed.

The present invention will be illustrated by certain examples and references which are provided for purposes of illustration only and are not intended to be limiting the invention.

EXAMPLE 1

Fine holes having a diameter of 1000 Å and a depth of 1 μm were formed in perpendicular to a surface of a substrate by emission of focused electron beams on the surface of the substrate having a thickness of 10 μm in which carbon black was uniformly dispersed. A surface density of the fine holes on the surface of the substrate was $7 \times 10^9$ hole/cm$^2$.

A magnetic paint obtained by uniformly dispersing cobalt fine powder having a diameter of 200 Å in a binder was coated on the surface of the substrate to fill it in the fine holes and excess of the magnetic paint was scraped off by a doctor blade.

Figure 3:
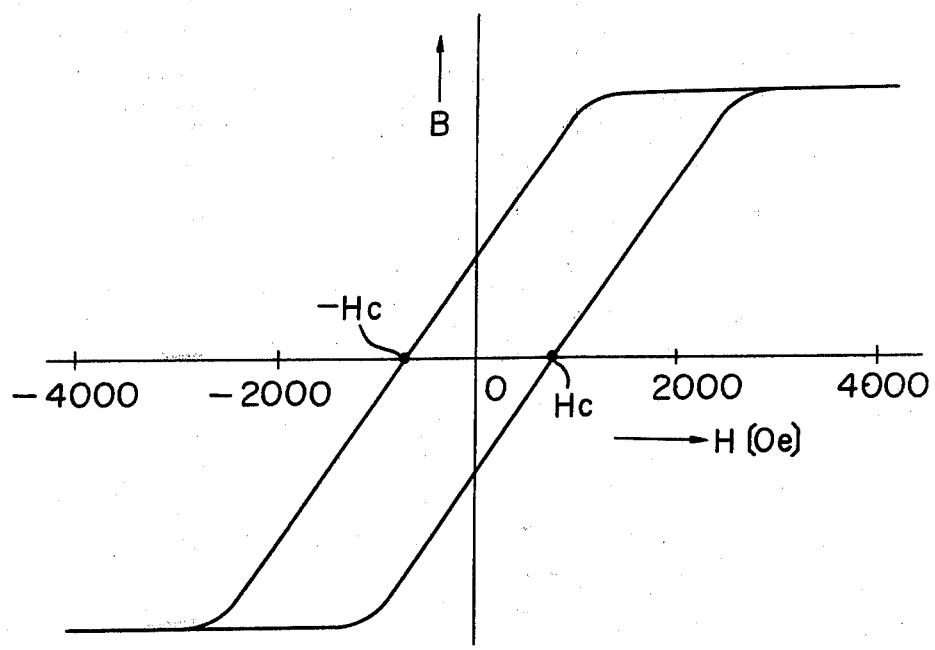
FIG. 3 is a B-H hysteresis characteristic curve in vertical direction for data of the magnetic recording medium prepared in Example 1.

FIG. 3 shows B-H hysteresis curve (measured data) of the resulting vertical magnetic recording medium in vertical direction. As it is shown in FIG. 3, the vertical magnetic recording medium of the present invention had excellent vertical orientation and high coercive force Hc of about 900 Oe. This is the ideal characteristic as the vertical magnetic recording medium.

EXAMPLE 2

Fine holes having a diameter of 500 Å and a depth of 5000 Å were formed in perpendicular to a surface of a substrate by emission of focused electron beams on the surface of the substrate made of Te—As—Se alloy. A surface density of fine holes was $1.4 \times 10^{10}$ holes/cm$^2$.

The substrate was dipped into a solution of $SnCl_2$ as a sensitivity treatment for easily adhere palladium on the substrate and then, the substrate was treated with a solution of Pd $Cl_2$ for an activation treatment which was carried out for accelerating growth of Co—P alloy on nuclears of palladium in the following plating treatment. The substrate was dipped in a plating bath having the following formulation for 30 minutes to fill the fine holes with Co—P alloy.

| Formulation of plating bath: | |
| --- | --- |
| $CoCl_2.6H_2$: | 0.05 mol/liter |
| $Na_3C_6H_5H_4.2H_2O$: | 0.05 mol/liter |
| $NaH_2PO_2.H_2O$: | 0.05 mol/liter |
| $NH_4Cl$: | 0.1 mol/liter |
| pH: | 8.5 |
| Temperature: | 60° C. |

Figure 4:
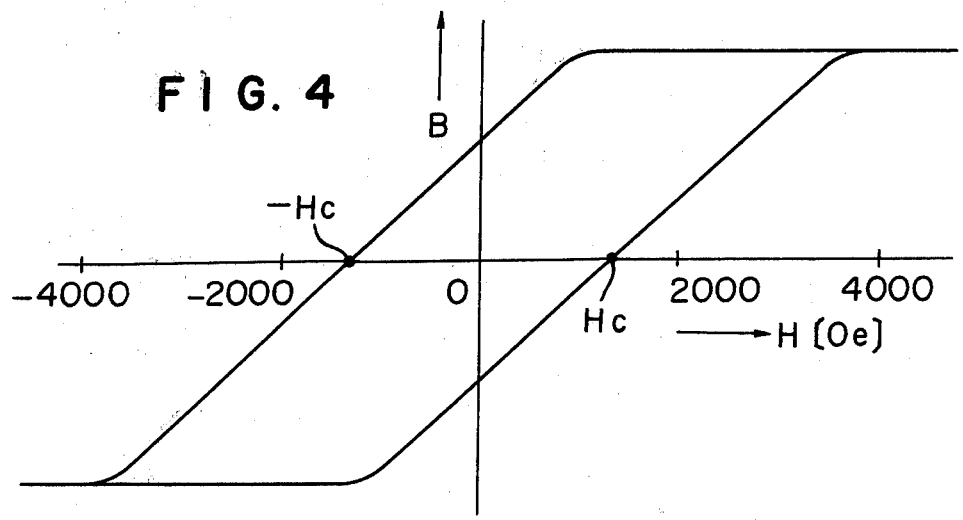
FIG. 4 is a B-H hysteresis characteristic curve in vertical direction for data of the magnetic recording medium prepared in Example 2.

FIG. 4 shows B-H hysteresis curve (measured data) of the resulting magnetic recording medium in vertical direction. As it is shown in FIG. 4, the vertical magnetic recording medium of the present invention had high coercive force Hc as about 1500 Oe. This is the ideal characteristic as the vertical magnetic recording medium.

The magnetic recording media of the present invention are used for digital recording whereby it attains to provide high recording density of more than 100 KBPI and high S/N ratio of more than 30 (dB). They are the ideal media as the vertical magnetic recording medium for high recording density.

In accordance with the magnetic recording medium of the present invention, the non-magnetic substrate has fine holes in the direction of thickness of the substrate which are filled with the magnetic material wherein the fine holes have a diameter of 200 Å to 5000 Å, a depth of 2000 Å to 5 μm at a ratio of depth/diameter of 1 or more. Therefore, it provide the magnetic recording medium having super characteristics as the ideal characteristics for the vertical magnetic recording medium for high recording density.

In accordance with the process for producing the magnetic recording medium of the present invention, the fine holes are formed by emission of the focused energy beams such as electron beams on the surface of the non-magnetic substrate and the fine holes are filled with the magnetic material. Therefore, the size and density of the fine holes can be easily controlled as desired by selecting a condition of emission of the energy beams and the uniformity of the fine holes is remarkably excellent. The vertical magnetic recording medium which is ideal for high density recording can be easily produced.

I claim:

1. In a magnetic recording medium having a high density of magnetic recording including a non-magnetic substrate having fine holes in a direction of thickness and a magnetic material filled in said fine holes, an improvement wherein said fine holes have a diameter ranging from 200 Angstroms to 5000 Angstroms and a depth ranging from 2000 Angstroms to 5 microns at a ratio of depth to diameter of substantially 10.

2. The magnetic recording medium according to claim 1 wherein said fine holes have a surface density of said holes ranging from $1.6 \times 10^7$ holes/cm$^2$ to $1.6 \times 10^{11}$ holes/cm$^2$ on said non-magnetic substrate.

* * * * *

UNITED STATES PATENT AND TRADEMARK OFFICE
CERTIFICATE OF CORRECTION

PATENT NO.  : 4,393,110
DATED       : July 12, 1983
INVENTOR(S) : Kazumasa Fukuda It is certified that error appears in the above-identified patent and that said Letters Patent is hereby corrected as shown below: On the title page add:

-- [30] Foreign Application Priority Data

March 7, 1981 Japan.....32764/1981 --

Signed and Sealed this

Twenty-seventh Day of December 1983

[SEAL]

Attest:

GERALD J. MOSSINGHOFF

Attesting Officer

Commissioner of Patents and Trademarks